Nov. 25, 1969    J. R. GOODYKOONTZ    3,480,208
FLUIDIC NUMERIC READOUT DEVICE
Filed Jan. 15, 1968    3 Sheets-Sheet 1
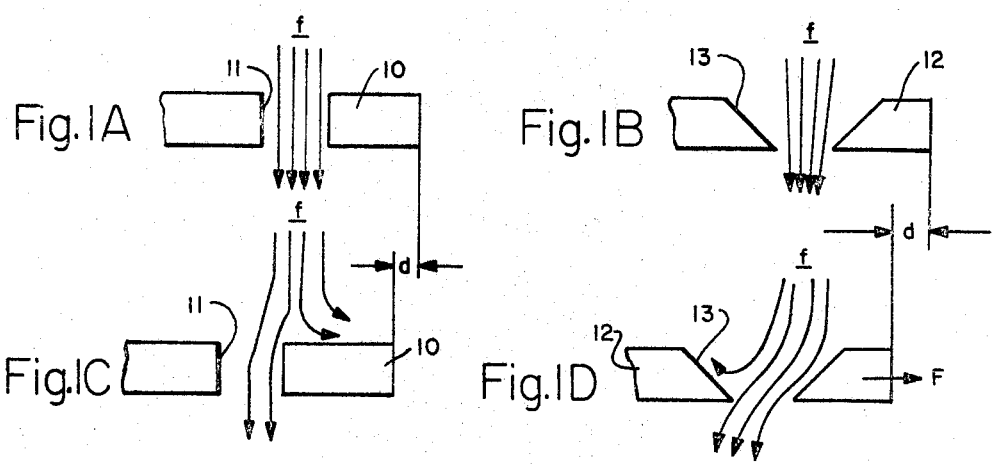
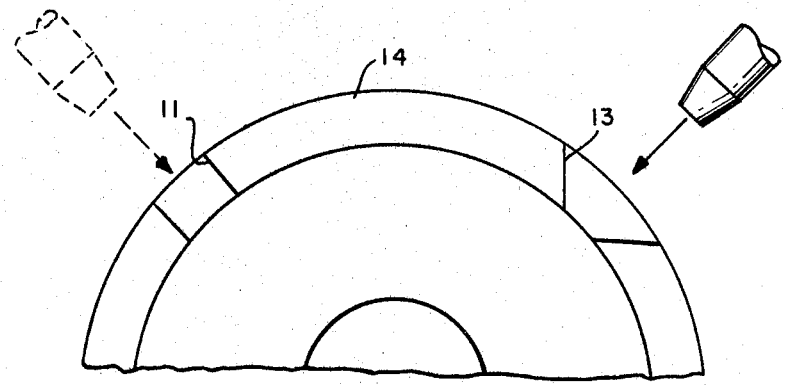
Fig. 2
James R. Goodykoontz
INVENTOR.
BY
*Donald C. Kearney*
ATTORNEY Nov. 25, 1969   J. R. GOODYKOONTZ   3,480,208
FLUIDIC NUMERIC READOUT DEVICE
Filed Jan. 15, 1968                 3 Sheets-Sheet 2

James R. Goodykoontz
INVENTOR.

BY
Donald C. Kearney
ATTORNEY

United States Patent Office 3,480,208
Patented Nov. 25, 1969

3,480,208
FLUIDIC NUMERIC READOUT DEVICE
James R. Goodykoontz, Santa Monica, Calif., assignor to TRW Inc., Redondo Beach, Calif., a corporation of Ohio
Filed Jan. 15, 1968, Ser. No. 697,877
Int. Cl. G06d 1/00; G06m 1/12
U.S. Cl. 235—201                 6 Claims

ABSTRACT OF THE DISCLOSURE

There is disclosed a device providing a direct readout capability for a fluidic system thus avoiding the need to go through a conversion to electrical signals in order to provide numeric information. The device consists of a light weight cylinder which is free to rotate about its axis. The output of a plurality of fluidic flip-flops equal in number to the number of binary digits represented, impinge directly onto the surface of the cylinder. Additionally, a constant flow jet impinges on a turbine track on the cylinder causing it to rotate. The flip-flop outputs act to overpower the turbine drive, the force of which is adjusted so that the cylinder will stop only at a predetermined position in which all of the flip-flops are exerting maximum force for the number represented. A numeric visual readout track then indicates what this equivalent number is and a magnetic numeric representation may also be read by conventional reading heads if it is desired to use the device as a binary to digital converter providing both optical and electrical readout.

BACKGROUND OF THE INVENTION

This invention relates to the field of fluidics and more particularly to a binary to decimal converter which affords a direct readout from fluidic devices without requiring conversion to an electrical signal. The technology commonly referred to as "fluidics" has recentlly developed rapidly and stems largely from the early work of Nicola Tesla and Henri Coanda, the latter of whom was responsible for identifying the wall attachment phenomenon of fluids which is now referred to as the Coanda effect. Various fluidic control systems and computer devices have since been developed. These include digital logic devices and proportional amplifiers. Unlike the more conventional fluid control technology which has relied on valves, springs, balls, diaphragms, and the like, this new class of devices can carry out many functions which have heretofore been performed only by electronic devices. Fluidic devices are preferred over mechanical fluid power control equipment because of their high reliability due to the absence of moving parts, their greater environmental tolerance, their reduction in size and weight, and their lower manufacturing cost. In many applications they are preferred over comparable electronic devices due to their tolerance of temperature extreme and immunity from nuclear radiation effects, shock and vibration and from stray radio frequency signals. Additionally, these devices do not themselves emit radio frequency signals and are generally less costly to produce than equivalent electronic circuits. Many of these advantages are lost, however, if it is necessary to convert a fluidic system output to an electrical or electronic form in order to actuate conventional visual and mechanical readout devices. Also, it is frequently necessary for fluidic devices to communicate with electronic systems or devices. It is, therefore, desirable to have a fluidic readout device which can acord either a direct visual or mechanical output reading or which can convert a fluidic binary numeric output directly into a decimal electronic signal, thus performing both the binary to decimal conversion and the fluidic to electronic conversion in a single step by a single device. No such apparatus has heretofore been available.

For a description of the prior art at it is known, reference is made to a book entitled, Fluid Amplifiers by Joseph M. Kirshner, published by McGraw-Hill in 1966 or to work entitled Fluidics by Eugene F. Humphrey and Dave H. Taimouto, published by the Fluid Amplifier Associates, Inc., Boston, Massachusetts 1965.

SUMMARY OF THE INVENTION

It is an object of this invention to provide a direct fluidic numeric readout device.

It is a further object of this invention to provide a direct fluidic numeric readout device which serves to convert fluidic binary numeric information into decimal information which is visually readable and which simultaneously may be converted to magnetic or electrical representation if desired.

These objects are achieved as noted above by providing a rotating cylinder on which the output of fluidic binary devices impinges. A signal track containing a pattern of holes in the cylinder wall is provided in a position corresponding to that of and receiving the output from each fluidic binary device. Two types of holes are provided. One has straight walls and the other has tapered walls. It can be shown that fluid impinging on the straight wall holes exerts very little force on the cylinder, whereas fluid impinging on the tapered wall hole will tend to retard the cylinder which is simultaneously driven from a constant force turbine jet. When the horizontal pattern of holes axially along the cylinder wall contains all tapered holes, corresponding to a precoded number, the incremental force exerted on the cylinder is just sufficient to stop its rotation and to bring a decimal numeric indicator into a viewing window or under a magnetic reading head.

BRIEF DESCRIPTION OF THE DRAWINGS

Other objects and features of the invention will be apparent from the following description and claims taken in conjunction with the accompanying drawings, wherein:

FIGURES 1A, 1B, 1C and 1D are diagrammatic illustrations showing the effects of fluid impingement on straight wall holes and tapered wall holes respectively, while the cylinder surface is either stationary or moving, respectively.

FIGURE 2 is a diagrammatic representation of the cylinder wall arrangement.

DESCRIPTION OF THE PREFERRED EMBODIMENT

Figure 3:
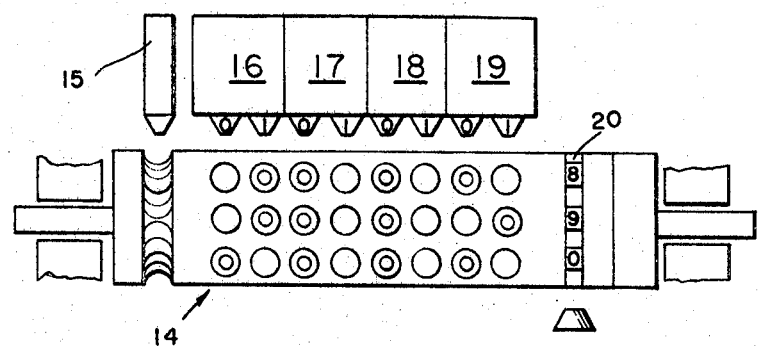
FIGURE 3 is an elevational view partially schematic showing the arrangement of the binary fluidic flip-flops with respect to the cylinder walls.

To better understand the basic physics of the device, consider in FIGURE 1A a stationary plate 10 with a straight bore 11 passing therethrough through which fluid $f$ flows at a velocity V. Since there is no fluid deflection, the plate experiences no lateral force. If a similar plate 12 has a tapered bore 13 therein as shown in FIGURE 1B, through which the fluid $f$ again flows at a velocity V, very little difference in effect exists except for the minor increase in backpressure which is irrelevant here. This lack of difference arises, however, from the fact that the two plates considered in 1A and 1B are stationary.

Consider now the same plates in motion as illustrated in FIGURES 1C and 1D. If the plates move through a distance $d$ from right to left as seen in the drawing under the influence of some external force, then for the straight bore plate 10 both the fluid deflection and the resulting lateral force exerted by the fluid on the plate are minor as seen in FIGURE 1C. However, in the case of the tapered bore plate as seen in FIGURE 1D, the fluid stream impinges on the bore taper surface and exerts a significant component of force F in a direction from left to right opposing the motion of the plate. The fluid stream undergoes severe deflection and imparts large lateral force F to the plate. The plate acts to center the tapered hole about the fluid stream.

The sketch in FIGURE 2 illustrates the skeleton of the design idea incorporated in this device utilizing the above discussed phenomena. A rotating hollow drum 14 has both straight bores 11 and tapered bores 13 formed in the circumference of the drum. The impinging jets exert a circumferential retarding force on the drums which varies from insignificant to major depending on whether the jets impinge on a straight or a tapered bore. Four flip-flops 16, 17, 18 and 19, each having two possible outputs (one representing zero and one representing one) act on correspondingly positioned tracks with straight and tapered bores, and a numerical display decimal readout track or indicator 20. The flip-flop output representing the zero state is indicated by the flip-flop number with suffix A as at 16A, 17A, 18A and 19A. The flip-flop output representing a binary number 1 is represented by the flip-flop number with suffix B as in 16B, 17B, 18B and 19B.

Figure 4:
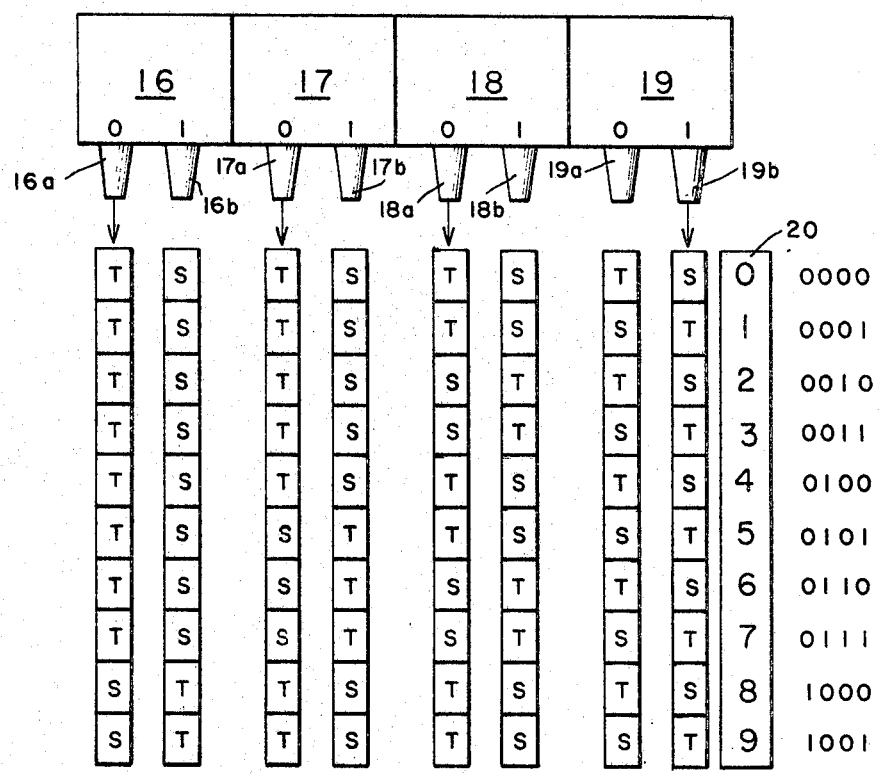
FIGURE 4 is a diagrammatic view in which the signal tracks around the periphery of the cylinder wall are shown in rolled out plan view in order to illustrate the pattern by which conversion from binary to decimal notation is achieved.

It will be noted in FIGURE 4 that the 10 decimal digits are shown arranged in indicator track 20 and have the equivalent binary representation displayed to the right thereof. As is well known, any of the first 10 decimal digits can be represented by not more than four binary digits as shown in FIGURE 4.

In order to mechanically implement the device of the present invention, it is necessary that the tapered hole on the circumferential tracks falling under the binary flip-flops be positioned in either the zero or the one column (that is to say, the column under either the zero or one output of its flip-flop) in accordance with whether the binary bit representative of the decimal number in the intersection of the column with the horizontal row in which the holes lie is a zero or a one. Thus, since the binary representation of decimal zero is 0000, the top horizontal row of holes in FIGURE 4 aligned with .0 has a tapered hole indicated by a T in the corresponding block positioned under the 0 output of all of the flip-flops. It will be noted from the diagram, this is the only decimal digit in which this configuration of hole positioning occurs. Going, for example, to decimal digit 1, which in binary notation is 0001, it will be noted that the first three binary positions under flip-flop 16, 17 and 18 have the tapered hole under the zero or A outlet but that the tapered hole for flip-flop 19 is under the one or 19B outlet. Thus, if all of the binary zero outlets 16A, 17A, 18A and 19A are actuated representing binary zero, all of these outlets will fall on a tapered hole only in the decimal zero position of rotation of the cylinder.

More generally, the circumferential column of holes which is disposed around the cylinder 14 under each of the outlets of the binary flip-flops and which are shown in diagrammatic unrolled form in FIGURE 4 have the holes therein aligned horizontally or axially along the cylinder to form horizontal axial rows of holes each row including four holes and thus affording a capacity of one decimal digit representation. The illustration shows the arrangement of the straight and tapered holes necessary to represent the first decimal digit utilizing four pairs of binary holes. In general, as noted above, the tapered hole must be positioned under either the zero or the one representing binary fluid outlet in accordance with whether that binary digit is a zero or a one in the binary representation of the decimal digit corresponding to that row of holes. That is to say, the tapered hole can be thought of as indicating the selection of a binary zero or a binary one in accordance with its position either under the zero or A outlet or under the one or B outlet for that particular binary bit. That this must be so is a consequence of the fact that it is only the tapered holes which are effective to exert a retarding force on the rotating cylinder. Hence, if the holes are arranged in the pattern shown, all four holes will be exerting force and hence maximum force will be exerted only for the deciman position corresponding to the binary number being represented by the readout of the flip-flops 16, 17, 18 and 19. The torque level of the turbine 15 is sufficient to overcome one, two or three flip-flop outputs acting on tapered rather than straight bores and thus to keep the cylinder rotating. However, when four flip-flop outputs impinge simultaneously on tapered bores, the turbine drive stalls and the readout drum comes to rest in a specific angular position to display the decimal number aligned with that row of tapered holes in a readout window such as the window 22 in the housing 21 seen in FIGURES 5 and 6.

In the arrangement shown in the drawings, the flip-flop outputs represent binary equivalents of decimal numbers from zero to nine and are cross-coded with tapered or straight bore patterns. For any given fluidic output combination, only one row contains four tapered bores, all others contain fewer. Of course, it will be understood that if more than one decimal digit were to be represented, a separate cylindrical drum and window arrangement would be used for each decimal digit, although the plurality of drums could easily be mounted in the same housing.

Figure 5:
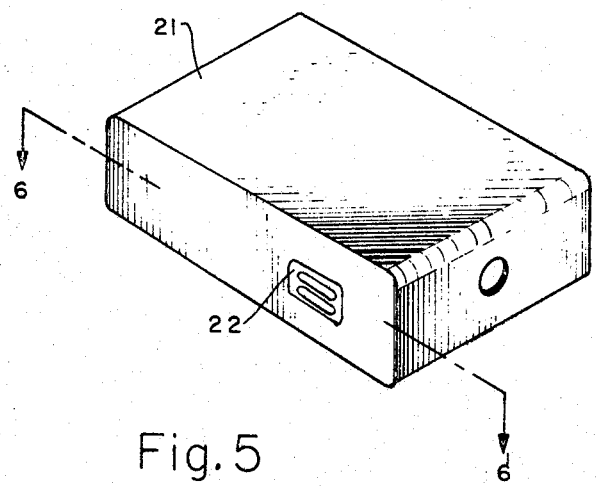
FIGURE 5 is an isometric view of a housing suitable for containing the apparatus described herein.
Figure 6:
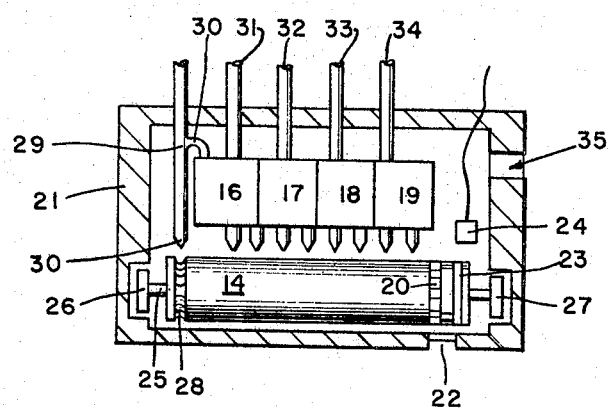
FIGURE 6 is a sectional view taken on line 6—6 of FIGURE 5.

The housing 21, as may be seen in FIGURES 5 and 6, is provided with a window 22 through which the decimal numeric display track 20 may be viewed. Adjacent to the display track 20 is a track 23 on which magnetic representation of the decimal digit are recorded and which are adapted to be read by a magnetic reading head 24. The reading head 24 may be of any suitable conventional design which is adapted to provide a readout signal when and only when the magnetic material passing beneath it comes to rest in a stationary position. The head can, for example, be similar to that used in check reading apparatus. The sensor for determining that the magnetic characters have stopped rotation could, for example, obviously be a coil actuated relay such that the read circuit is actuated only when no voltage is induced in the coil by magnetic characters rotating beneath it. The electrical output from the read head 24 can be connected to electrical or electronic circuitry in any conventional manner.

As can also be seen in FIGURE 6, the drum 14 is mounted on an axle 25 which is free to rotate between end bearing mounts 26 and 27 supported in the walls of the housing 21. The turbine track 28 on drum 14 is positioned to be actuated by fluid supplied through power input tube 29 which has a discharge nozzle 30 directed at turbine 28 and which also supplies the power fluid to the flip-flops 16, 17, 18 and 19 through a branch 30. Additionally, each flip-flop is provided with a signal input fluid line shown as lines 31, 32, 33 and 34. The housing 21 is also provided with a signal input fluid line shown as lines 31, 32, 33 and 34. The housing 21 is also provided with an exhaust port 35 so that excess fluid may be exhausted to ambient atmosphere when the working fluid is air or any other convenient gas.

Although only a single drum representing one decimal digit has been shown, it will of course be understood that a plurality of drums could be stacked vertically in a single housing to provide readout for as many digits as is desired. It is also apparent that the basic device is susceptible to many other modifications.

What is claimed is:
1. A fluidic binary-decimal converter and readout device comprising:
   (a) a plurality of fluidic binary devices each having first and second fluid outputs representing binary zero and binary one respectively; and
   (b) rotary indicator means directly mechanically responsive to the output pattern of said fluidic binary devices, said indicator means affording a decimal indication of the binary number represented by said output pattern of said fluidic binary devices by comparing the total force exerted on said rotary indicator means by said fluidic binary devices with a constant drive force applied to said indicator means, said drive force being preselected to have a magnitude sufficient to overcome said fluidic forces and move said indicator means in all but one preselected position corresponding to the binary number represented by the outputs of said fluidic binary devices.

2. A fluidic binary converter and readout device comprising:
   (a) a plurality of fluidic binary devices each having first and second alternatively operative fluid output means;
   (b) movable means operatively positioned to be responsive to the output pattern of said fluidic binary devices, said movable means having thereon a plurality of first type fluid receiving means operative to generate a small retarding force when fluid impinges thereon and a plurality of second type fluid receiving means operative to generate a larger retarding force when fluid impinges thereon;
   (c) means to drive said movable means with a force adjusted to be lareg enough to overcome a retarding force applied by said fluidic binary devices in all but one preselected position, said preselected position of said movable means positioning all of said second type fluid receiving means in a position to receive fluid from the operative one of said fluid output means representing a preselected binary number, the position of said movable means thus affording an indication of the binary number represented by said output pattern of said fluidic binary devices.

3. A fluidic binary decimal converter and readout device comprising:
   (a) a plurality of fluidic binary devices each having first and second alternatively operative fluid output means;
   (b) rotatably mounted cylindrical drum means positioned to receive the output of said fluidic binary devices axially along a sidewall thereof;
   (c) a plurality of circumferentially arranged apertures positioned on the surface of said drum means so that a group of ten of said apertures for each decimal digit to be represented is coaligned with each output of each of said binary devices, a first type of said aperture offering little resistance to fluid flow and a second type of said aperture offering greater resistance to fluid flow so that impingement of fluid thereon imparts a force to said drum;
   (d) fluid turbine means to drive said drum in a direction of rotation opposite to that in which the force applied by said second type of apertures tends to rotate said drum, said turbine means being driven by a fluid exerting a force sufficient to overcome the forces exerted by said apertures in all but one preselected position of said drum apertures with respect to said binary devices so that said drum will stop only in said preselected position corresponding to the instantaneous output pattern of said binary devices; and
   (e) indicator means comprising decimal digits arranged peripherally around the surface of said drum in such a fashion that the decimal digit appearing at a preselected viewing station when said drum is stopped at any given position corresponds to the binary number represented by the output pattern of said fluidic binary devices which is uniquely able to stop said drum at said position.

4. Apparatus as in claim 3 and further including magnetic numeric characters positioned on said drum surface to afford a decimal indication of the numeric value of said binary outputs and magnetic reading head means positioned to sense the magnetic character on said drum stops under said reading head in order to afford an electrical output representation of said decimal digit.

5. A fluidic readout device comprising:
   (a) fluidic means to represent a binary number, each of said fluidic means having first and second fluid outputs representing binary zero and binary one respectively;
   (b) rotary indicator means comprising a unitary cylinder responsive to the outputs of said fluidic means to provide a visual decimal representation of said binary number; and
   (c) transducer means operatively associated with said indicator means to provide an electrical representation of said decimal number when and only when said rotary indicator means is at rest.

6. A fluidic binary converter and output device comprising:
   (a) a plurality of fluidic binary devices each having first and second alternatively operative outputs representing binary zero and binary one respectively;
   (b) a rotatively mounted member positioned to be directly responsive to the fluid output pattern of said fluidic binary devices, said member having therein a first type of fluid receiving means offering little resistance to fluid flow from said binary devices and a second type of fluid receiving means offering greater resistance to fluid flow from said binary devices so that impingement of fluid on said second type of means imparts a significant retarding force to said member;
   (c) means to apply a drive force to rotate said member in a direction opposite to that in which the force applied by fluid from said binary devices impinging on said second type of fluid receiving means tends to rotate said member, said driving force having a magnitude sufficient to overcome the forces exerted by fluid from said binary device impinging on said member in all but one preselected position of said member with respect to said binary devices so that said member will stop only in said preselected position corresponding to the instantaneous output pattern of said binary devices to thereby afford an indication of the binary number being represented.

References Cited

UNITED STATES PATENTS

| | | | |
|---|---|---|---|
| 3,364,342 | 1/1968 | Jakubowski | 235—301 |
| 3,433,238 | 3/1969 | Nightingale | 235—201 |
| 2,911,956 | 11/1959 | Smith | 235—200 |
| 3,263,922 | 8/1966 | Voit | 235—201 |
| 3,305,170 | 2/1967 | Zilberfarb | 235—201 |

RICHARD B. WILKINSON, Primary Examiner

LAWRENCE R. FRANKLIN, Assistant Examiner